(12) United States Patent
Eilers et al.

(10) Patent No.: US 7,811,462 B2
(45) Date of Patent: Oct. 12, 2010

(54) ADDITIVE DISPERSING FILTER AND METHOD OF MAKING

(75) Inventors: Derek Eilers, Denver, CO (US); Daniel J. Auxter, Perrysburg, OH (US); Michael S. Lynch, Fostoria, OH (US); Gerard W. Bilski, Perrysburg, OH (US); Gary B. Zulauf, Findlay, OH (US)

(73) Assignee: Honeywell International, Inc., Morristown, NJ (US)

( * ) Notice: Subject to any disclaimer, the term of this patent is extended or adjusted under 35 U.S.C. 154(b) by 892 days.

(21) Appl. No.: 11/679,148

(22) Filed: Feb. 26, 2007

(65) Prior Publication Data

US 2008/0099407 A1 May 1, 2008

Related U.S. Application Data

(63) Continuation of application No. 10/863,581, filed on Jun. 8, 2004, now Pat. No. 7,182,863, which is a continuation-in-part of application No. 10/352,344, filed on Jan. 27, 2003, now Pat. No. 7,018,531, which is a continuation-in-part of application No. 09/867,973, filed on May 30, 2001, now Pat. No. 7,291,264, which is a continuation-in-part of application No. 09/566,034, filed on May 8, 2000, now abandoned.

(51) Int. Cl.
*B65B 1/04* (2006.01)

(52) U.S. Cl. .................. 210/749; 210/205; 210/206; 210/209; 210/266; 210/282; 210/287; 210/416.5; 210/767; 210/DIG. 17; 141/2

(58) Field of Classification Search ............ 55/431, 55/466; 210/205, 206, 209, 266, 282, 287, 210/416.5, 767, DIG. 17, 749; 141/2
See application file for complete search history.

(56) References Cited

U.S. PATENT DOCUMENTS 2,262,526 A 11/1941 Fairlie et al.

(Continued)

FOREIGN PATENT DOCUMENTS

DE 157197 A1 10/1982

(Continued)

OTHER PUBLICATIONS

International Search Report dated Jun. 3, 2004 for PCT/US2004/002144.
Written Opinion of the International Searching Authority for dated Jun. 3, 2004 for PCT/US2004/002144.

*Primary Examiner*—Duane Smith
*Assistant Examiner*—Minh-Chau Pham
(74) *Attorney, Agent, or Firm*—Cantor Colburn LLP

(57) ABSTRACT

A method for dispersing an oil additive into an oil passing through a filter, the method comprising: filling a first cavity of an additive cartridge with an additive; locating the additive cartridge within a housing of the filter, the additive cartridge being located within a flow path through the filter, the additive cartridge having a second cavity without any additive disposed therein, the second cavity defining a first fluid path through the additive cartridge and the oil must pass through the second cavity in order to exit the filter; and metering the additive through an opening in the additive cartridge, the opening providing a second fluid path into the additive cartridge.

20 Claims, 13 Drawing Sheets

U.S. PATENT DOCUMENTS

| | | | |
|---|---|---|---|
| 2,310,305 A | 2/1943 | Miller et al. | |
| 2,618,586 A | 11/1952 | Hendel | |
| 3,336,223 A | 8/1967 | Kneeland | |
| 4,075,097 A | 2/1978 | Paul | |
| 4,075,098 A | 2/1978 | Paul et al. | |
| 4,113,606 A | 9/1978 | Mulaskey | |
| 4,144,166 A | 3/1979 | DeJovine | |
| 4,144,169 A | 3/1979 | Grueschow | |
| 4,168,225 A | 9/1979 | Jackson | |
| 4,211,639 A | 7/1980 | Jackson | |
| 4,265,748 A | 5/1981 | Villani et al. | |
| 4,523,532 A | 6/1985 | Moriarty et al. | |
| 4,557,289 A | 12/1985 | Fields | |
| 4,660,645 A | 4/1987 | Newlove et al. | |
| 4,751,901 A | 6/1988 | Moor | |
| 4,755,289 A | 7/1988 | Villani | |
| 4,886,599 A | 12/1989 | Bachmann et al. | |
| 4,888,122 A | 12/1989 | McCready | |
| 4,895,640 A | 1/1990 | Jackson | |
| 4,902,408 A | 2/1990 | Reichert et al. | |
| 4,906,389 A | 3/1990 | Brownawell et al. | |
| 5,032,259 A * | 7/1991 | He et al. | 210/133 |
| 5,042,617 A | 8/1991 | Brownawell et al. | |
| 5,057,368 A | 10/1991 | Largman et al. | |
| 5,069,799 A | 12/1991 | Brownawell et al. | |
| 5,069,970 A | 12/1991 | Largman et al. | |
| 5,094,747 A | 3/1992 | Johnson | |
| 5,199,978 A | 4/1993 | Poirier et al. | |
| 5,209,842 A | 5/1993 | Moor | |
| 5,225,081 A | 7/1993 | Brownawell | |
| 5,435,346 A * | 7/1995 | Tregidgo et al. | 137/564.5 |
| 5,472,875 A | 12/1995 | Monticello | |
| 5,478,463 A | 12/1995 | Brownawell et al. | |
| 5,527,452 A | 6/1996 | Grigoriev et al. | |
| 5,552,040 A | 9/1996 | Baehler et al. | |
| 5,554,699 A | 9/1996 | Layer et al. | |
| 5,591,330 A | 1/1997 | Lefebvre | |
| 5,704,966 A | 1/1998 | Rohrbach et al. | |
| 5,713,971 A | 2/1998 | Rohrbach et al. | |
| 5,718,258 A | 2/1998 | Lefebvre et al. | |
| 5,725,031 A * | 3/1998 | Bilski et al. | 141/2 |
| 5,741,433 A | 4/1998 | Mitchell et al. | |
| 5,744,236 A | 4/1998 | Rohrbach et al. | |
| 5,759,394 A | 6/1998 | Rohrbach et al. | |
| 5,772,873 A | 6/1998 | Hudgens et al. | |
| 5,891,221 A | 4/1999 | Rohrbach et al. | |
| 5,900,153 A | 5/1999 | Sanford | |
| 5,902,384 A | 5/1999 | Rohrbach et al. | |
| 5,942,323 A | 8/1999 | England | |
| 5,948,248 A | 9/1999 | Brown | |
| 5,951,744 A | 9/1999 | Rohrbach et al. | |
| 6,004,381 A | 12/1999 | Rohrbach et al. | |
| 6,045,692 A | 4/2000 | Bilski et al. | |
| 6,048,614 A | 4/2000 | Rohrbach et al. | |
| 6,117,802 A | 9/2000 | Rohrbach et al. | |
| 6,126,823 A | 10/2000 | Soderlund et al. | |
| 6,127,036 A | 10/2000 | Xue et al. | |
| 6,129,835 A | 10/2000 | Lesieur et al. | |
| 6,235,519 B1 | 5/2001 | Wang et al. | |
| 6,238,554 B1 * | 5/2001 | Martin et al. | 210/109 |
| RE37,369 E | 9/2001 | Hudgens et al. | |
| 6,379,564 B1 | 4/2002 | Rohrbach et al. | |
| 6,639,034 B2 | 10/2003 | Sivik et al. | |
| 6,743,759 B2 | 6/2004 | Stunkel et al. | |
| 6,774,091 B2 | 8/2004 | Dituro et al. | |
| 6,827,750 B2 * | 12/2004 | Drozd et al. | 44/629 |
| 6,843,916 B2 | 1/2005 | Burrington et al. | |
| 6,860,241 B2 * | 3/2005 | Martin et al. | 123/1 A |
| 7,018,531 B2 * | 3/2006 | Eilers et al. | 210/205 |
| 7,182,863 B2 * | 2/2007 | Eilers et al. | 210/205 |
| 7,291,264 B2 * | 11/2007 | Rohrbach et al. | 210/209 |
| 7,316,778 B2 * | 1/2008 | Rohrbach et al. | 210/206 |
| 7,410,572 B2 * | 8/2008 | Beard et al. | 210/203 |
| 7,581,558 B2 * | 9/2009 | Martin et al. | 137/268 |
| 7,591,279 B2 * | 9/2009 | Martin et al. | 137/268 |
| 2002/0002118 A1 | 1/2002 | Brandt | |
| 2002/0136936 A1 | 9/2002 | Grieve et al. | |
| 2003/0111398 A1 | 6/2003 | Eilers et al. | |
| 2003/0119682 A1 | 6/2003 | Saini et al. | |
| 2003/0158501 A1 | 8/2003 | Uchida et al. | |
| 2004/0102335 A1 | 5/2004 | Carrick et al. | |

FOREIGN PATENT DOCUMENTS

| | | |
|---|---|---|
| DE | 4200376 A1 | 7/1993 |
| EP | 0078237 A1 | 5/1983 |
| EP | 0416905 A2 | 3/1991 |
| EP | 0416908 A2 | 3/1991 |
| EP | 1061251 A2 | 12/2000 |
| EP | 1061251 A3 | 6/2001 |
| FR | 51254 E | 2/1942 |
| FR | 2330856 | 6/1977 |
| GB | 203354 A | 9/1923 |
| GB | 904480 A | 8/1962 |
| JP | 9141011 A | 6/1997 |
| RU | 1776423 A1 | 11/1992 |
| SU | 572072 A1 | 4/1980 |
| WO | 9411556 A1 | 5/1994 |
| WO | 0162871 A1 | 8/2001 |
| WO | 0185300 A2 | 11/2001 |
| WO | 02096534 A1 | 12/2002 |

* cited by examiner

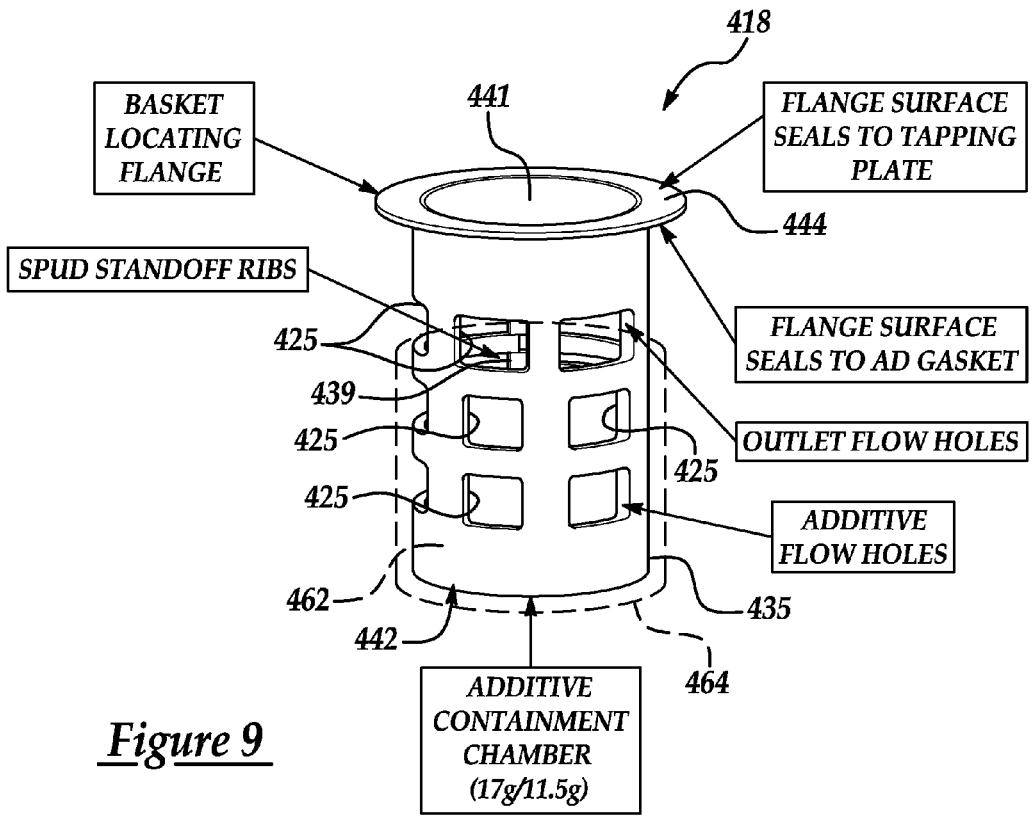
Figure 9
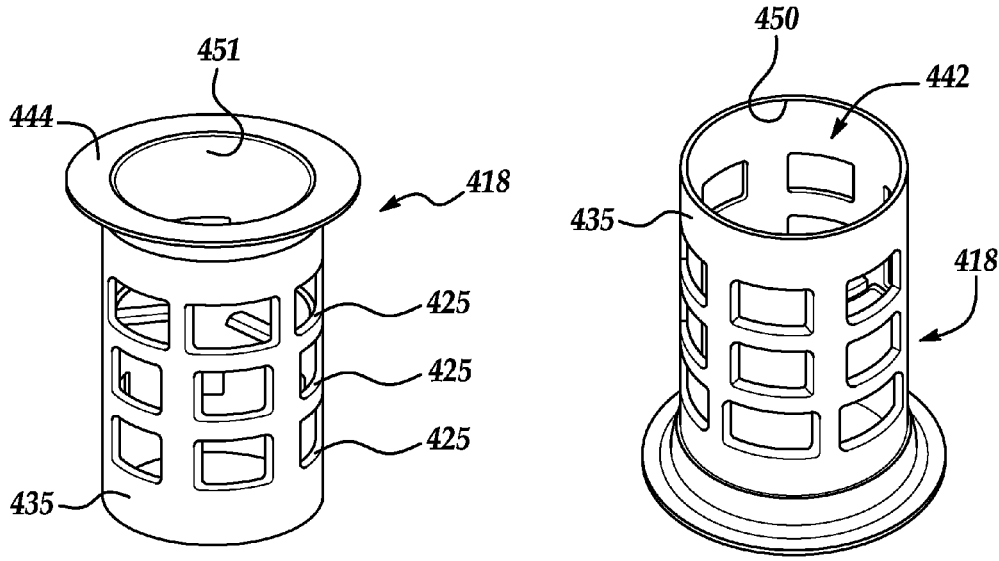
Figure 10
Figure 11

ADDITIVE DISPERSING FILTER AND METHOD OF MAKING

CROSS REFERENCE TO RELATED APPLICATIONS

The present application is a continuation of Ser. No. 10/863,581 filed Jun. 8, 2004, now U.S. Pat. No. 7,182,863 B2 which is a continuation-in-part of application Ser. No. 10/352,344, filed Jan. 27, 2003 now U.S. Pat. No. 7,018,531 B2, which is a continuation in part of Ser. No. 09/867,973, filed May 30, 2001, now U.S. Pat. No. 7,291,264 B2 which is a continuation in part of Ser. No. 09/566,034 filed May 8, 2000, now abandoned. The contents each of which are incorporated herein by reference thereto.

BACKGROUND

The present invention relates to a filter for a fluid and a method for making the same.

Many different types of fluid filters are known. Most such filters use a mechanical or 'screening' type of filtration, with a porous filter element disposed therein. The oil is repeatedly cycled through the filter element to remove impurities.

In the oil filtration art, it is well known that normal operation of an internal combustion engine, particularly a diesel engine, results in the formation of contaminants. These contaminants include, among others, soot, which is formed from incomplete combustion of the fossil fuel, and acids that result from combustion. These contaminants are typically introduced into the lubricating oil during engine operation, and tend to increase oil viscosity and generate unwanted engine deposits, leading to increased engine wear.

The conventional solution to these problems has been to place various additives into lubricating oils, during their initial formulation. In order to combat soot-related problems, many conventional lubricating oils include dispersants that resist agglomeration of soot therein. These work well for a short period, but may become depleted. Additionally, due to the solubility and chemical stability limits of these dispersants in the oil, the service lives of the lubricating oil and the oil filter are less than optimal.

In order to counteract the effects of acidic combustion products, many conventional motor oils include neutralizing additives known as over-based detergents. These are a source of TBN (total base number), which is a measure of the quantity of the over-based detergent in the oil. The depletion of the TBN is an important limiting factor for many internal combustion engines, and in particular for heavy-duty applications with diesel engines.

In order to improve engine protection and to combat other problems, conventional lubricating oils often include one or more further additives, which may be corrosion inhibitors, antioxidants, friction modifiers, pour point depressants, detergents, viscosity index improvers, anti-wear agents, and/or extreme pressure additives. The inclusion of these further additives may be beneficial; however, with conventional methods, the amount and concentration of these additives are limited by the ability of lubricating oils to suspend these additives, as well as by the chemical stability of these additives in the oil.

While the known filters are usable for their intended purposes, the release of supplemental additives from the known filters often takes place either immediately after installation or more rapidly than is needed for protecting the oil. Subsequently, after some time has elapsed, there may be little or no additive left in the filter.

Another problem with many of the known filter designs is that beneficial additives are added to the oil before the oil is mechanically filtered through a filter element. As a result, when the oil is mechanically filtered, some of the beneficial additives that have just been added may be immediately filtered out.

Therefore it is desirable to provide a filter having an additive incorporated therein, wherein the additive is slowly released over the useful life of the filter. It is also desirable to provide an oil filter which could extend the useful life of engine oil so as to allow a user to extend the time interval between oil changes in a vehicle, particularly a vehicle having a diesel engine.

SUMMARY OF THE INVENTION

An additive dispersing filter and method of making is provided. Exemplary embodiments provide a filter, comprising: a housing defining an inlet fluid opening and an outlet fluid opening, the inlet fluid opening and the outlet fluid opening defining a fluid path through the filter; a filter element disposed inside the filter housing, the filter element being disposed in the flow path such that fluid flowing through the flow path must pass through the filter; a center tube located within an interior area defined by the filter element; a dispersement device disposed within the center tube, the dispersement device comprising a first area and a second area, the first area being disposed proximate to the outlet fluid opening; and an additive composition disposed within the second area of the dispersement device, wherein fluid communication to the additive composition is facilitated through a plurality of openings in portions of the dispersement device defining the second area.

Also disclosed herein is a method for dispersing an additive into an oil from a filter, the method comprising: filling a first cavity of an additive cartridge with an additive; locating the additive cartridge within a housing of the filter, the additive cartridge being located within a flow path through the filter, the additive cartridge having a second cavity without any additive disposed therein, the second cavity defining a first fluid path through the additive cartridge and the oil must pass through the second cavity in order to exit the filter; and metering the additive through an opening in the additive cartridge, the opening providing a second fluid path into the additive cartridge.

Also disclosed herein is an additive dispersing member configured to be received within an oil filter, comprising: a main body portion defining a fluid flow path through a wall of the main body portion and a first area defined by the main body portion; and an additive receiving area for receiving and retaining an additive to be dispersed into fluid flowing through the fluid flow path, wherein fluid flowing through the fluid flow path is also in fluid communication with the additive.

An additive dispersing member configured to be received within an oil filter, comprising: an elongated main body portion having a wall portion and being open at either end; a first area and a second area defined by a dividing wall portion extending from the wall; a first plurality of openings in a portion of the wall portion defining the first area, the first plurality of openings and an open end of the elongated main body portion defining a flow path through the additive dispersing member; and a second plurality of openings in another portion of the wall portion defining the second area, the second plurality of openings and another open end of the elongated main body portion providing fluid communication to an additive disposed in the second area.

Exemplary embodiments of the present invention relate to an additive dispensing cartridge for an oil filter assembly, and to an oil filter incorporating the cartridge. More particularly, exemplary embodiments relate to an additive dispensing cartridge containing a beneficial additive composition, and to an oil filter having a centrally located additive dispenser incorporated therein. Other exemplary embodiments relate to an oil filter in which a centrally located additive dispenser, containing one or more oil-conditioning compounds therein, is operable to slowly release the oil conditioning compounds, over time, into filtered engine oil on the downstream, or 'clean' side of the filter element.

Exemplary embodiments of the present invention provide an improved oil filter, having a basic conditioner and/or another beneficial additive incorporated therein. In one embodiment, the beneficial additive is housed within a centrally located additive dispenser cartridge, which is operable to dispense an additive composition into relatively clean filtered oil that has already passed through the filter element.

In a particular embodiment of the invention, the additive chamber includes an additive cartridge which is a hollow shell, and a beneficial additive contained within the housing. The additive chamber is located inside of the mechanical filter element at a central part of the filter, so that the oil has already been mechanically filtered when additive is added thereto.

The apparatus according to the invention may also include a baffle for directing oil flow, and the additive cartridge may be attached to the baffle. Where the baffle is used, a dividing wall may be provided between the baffle and the additive chamber.

The additive cartridge has at least one opening, and may have a limited number of openings therein to control the rate of diffusion therefrom.

Accordingly, exemplary embodiments of the present invention provide an oil filter including one or more beneficial oil additives that are released slowly over the life of the filter.

The above-described and other features are appreciated and understood by those skilled in the art from the following detailed description, drawings, and appended claims.

DESCRIPTION OF THE DRAWINGS

FIGS. 9-11 are perspective views of an additive cartridge in accordance with exemplary embodiments of the present invention;

DETAILED DESCRIPTION OF EXEMPLARY EMBODIMENTS

Figure 1:
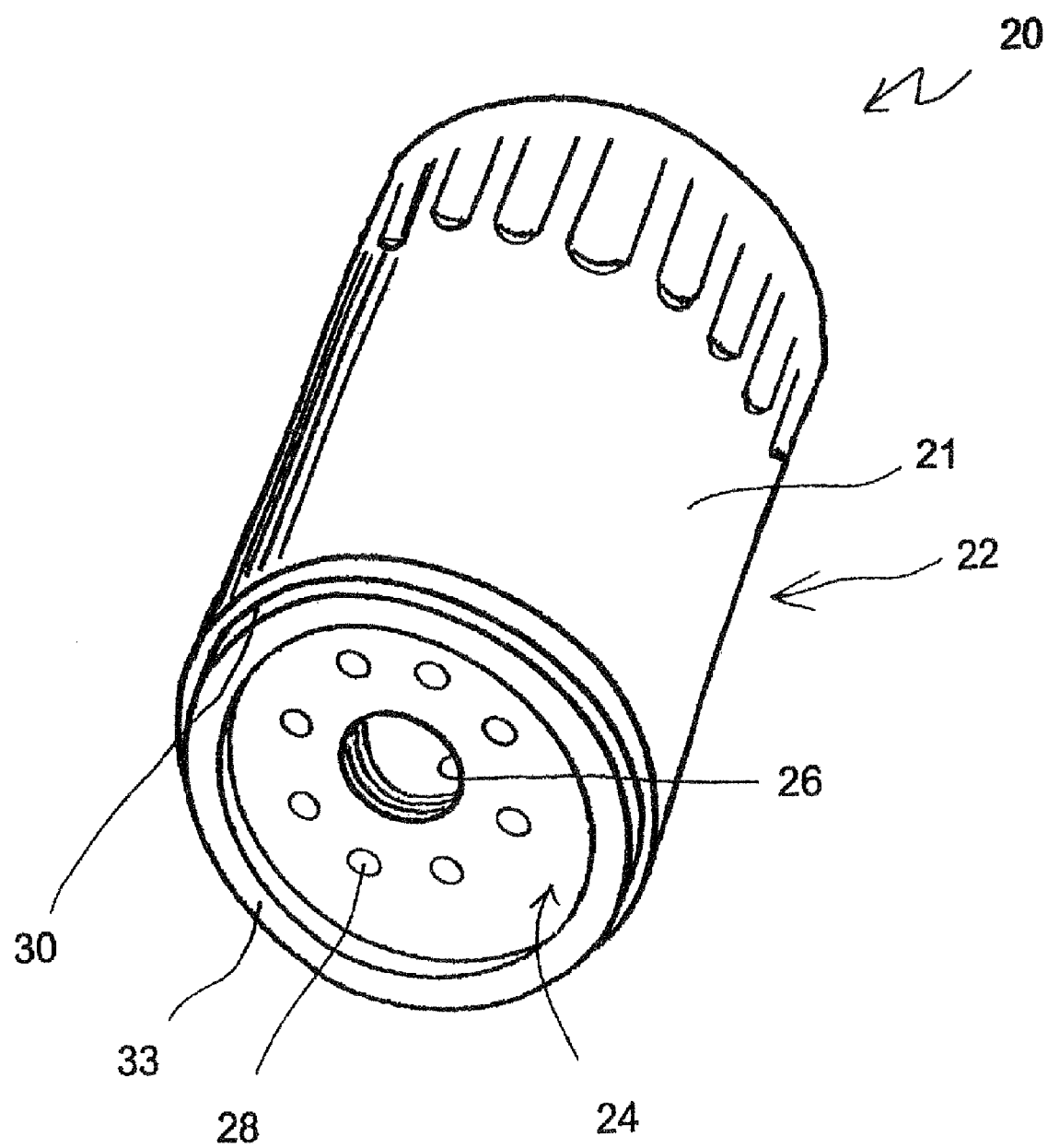
FIG. 1 is a perspective view of an oil filter in accordance with an exemplary embodiment of the present invention.

In accordance with exemplary embodiments of the present invention, a filter and method of making a filter is disclosed. In an exemplary embodiment the filter will be comprised of an additive cartridge for providing a means for introducing an additive into filtered oil. In addition, an additive cartridge and method of making is also disclosed wherein the cartridge provides a means for retaining an additive for dispersement into the oil over a period of time.

Throughout the present specification, relative positional terms like 'upper', 'lower', 'top', 'bottom', 'horizontal', 'vertical', and the like are used to refer to the filter and components in the orientation thereof shown in the drawings. These terms are used in an illustrative sense to describe the depicted embodiments, and are not meant to be limitative. It will be understood that in a specific application thereof, a filter may be installed on an engine in an orientation different from that shown in the drawings, such as inverted 180 degrees or transverse to that shown, and in such a case, the above-identified relative positional terms will no longer be accurate.

Figure 2A:
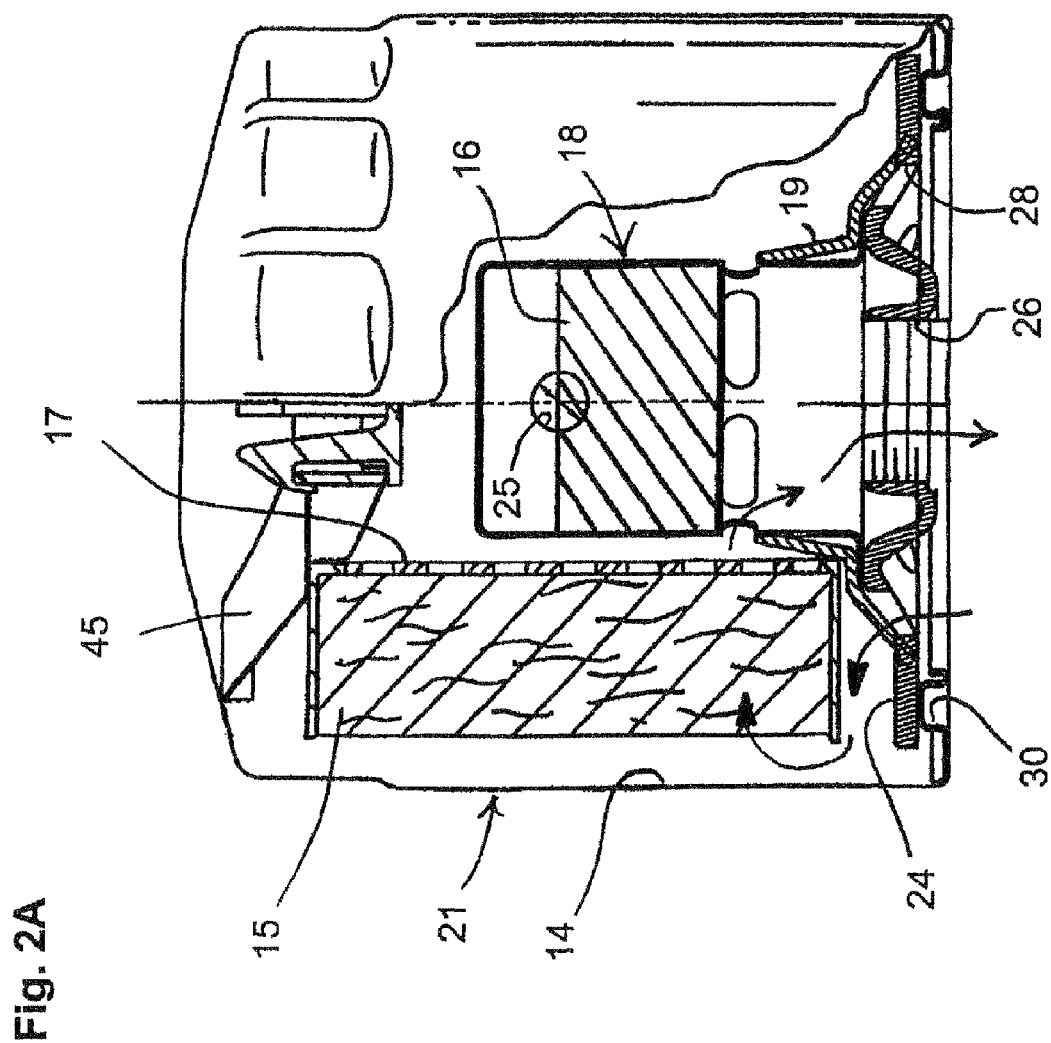
FIG. 2A is a side plan view of a first alternative exemplary embodiment of the oil filter of FIG. 1, partially cut away and partially shown in cross-section, wherein a hollow additive cartridge contains a solid block of an additive composition.

Referring to FIGS. 1 and 2A, there is shown an oil filter 20 according to a first exemplary embodiment of this invention. The direction of oil flow, through the filter 20, is shown by the arrows in FIG. 2A, which illustrate a flow path through the filter.

The oil filter 20 generally includes a hollow cylindrical housing 22 which defines a hollow chamber 14 therein, a porous, mechanical filter element 15 within that chamber, and a centrally located additive cartridge 18, also retained inside the housing chamber 14.

The housing 22 includes a hollow, generally cylindrical case 21, and a base plate 24 sealingly attached to the case.

A foraminous center tube 17 may, optionally, be provided within the filter housing 22 to supportively reinforce the mechanical filter element 15 thereon.

An anti-drainback valve 19 is provided inside the filter housing 22, at the base of the center tube 17, to keep oil in the filter 20 during engine shutoff, when the filter is mounted in the orientation shown in FIG. 2. The oil filter 20 may incorporate a spring-loaded pressure relief valve of a type known to those in the art. A retainer 45 may be provided above the center tube 17, to exert a downward pressure thereon.

The housing base plate 24 includes a plurality of inlet ports 28 formed therethrough and arranged in a circular pattern. The base plate 24 also includes a central outlet port 26. The outlet port 26 has a plurality of female threads formed therein, to allow rotatable mounting of the filter 20 on an externally threaded hollow tubular fitting on an engine block (not shown). An annular external seal or gasket 33 (FIG. 1) fits engagingly into a groove 30 formed at the bottom surface of the base plate, to resist oil leakage outwardly from the base of the filter.

In the depicted embodiment of FIGS. 1-2, the mechanical filter element 15 includes a conventional cylindrical member made of accordion-pleated filter paper.

Further in the embodiment of FIGS. 1-2A and 3-5, the filter 20 contains an additive cartridge 18 disposed centrally and coaxially inside of the center tube 17, in the middle of the mechanical filter element 15. The additive cartridge 18 includes a hollow cartridge shell 35, provided in a generally cylindrical shape, closed at the top and open at the bottom thereof in the orientation shown. The additive cartridge 18 also includes a solid additive composition 16 inside of the cartridge shell 35.

The hollow cartridge shell 35 has a cylindrical side wall 36 with a plurality of apertures 37 formed in a lower portion thereof. The cartridge shell 35 also includes a cap 38, which covers the top of the side wall 36 and is integrally formed therewith.

Figure 5:
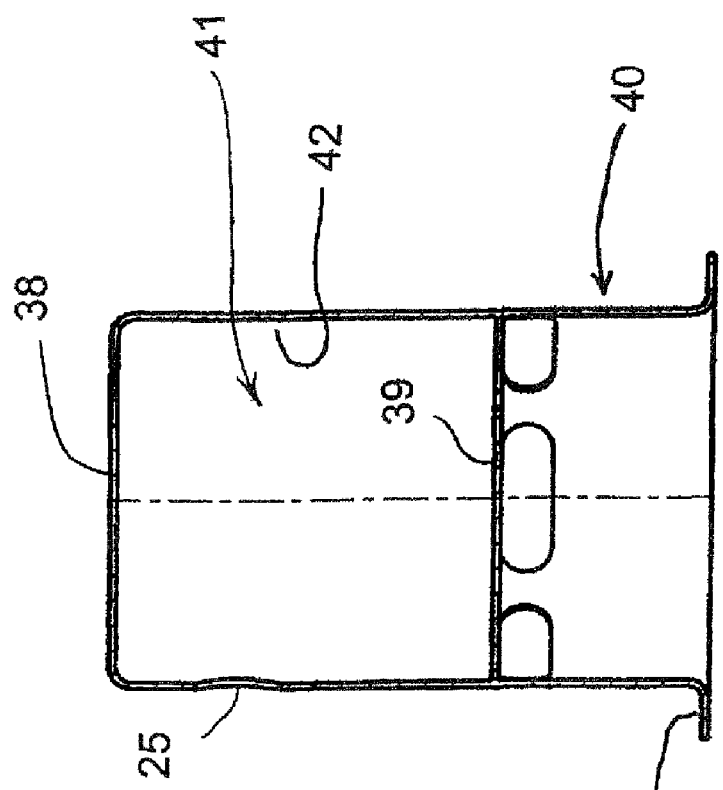
FIG. 5 is a cross-sectional view of the additive cartridge of FIGS. 3 and 4, taken along the line 5-5 in FIG. 3.
Figure 4:
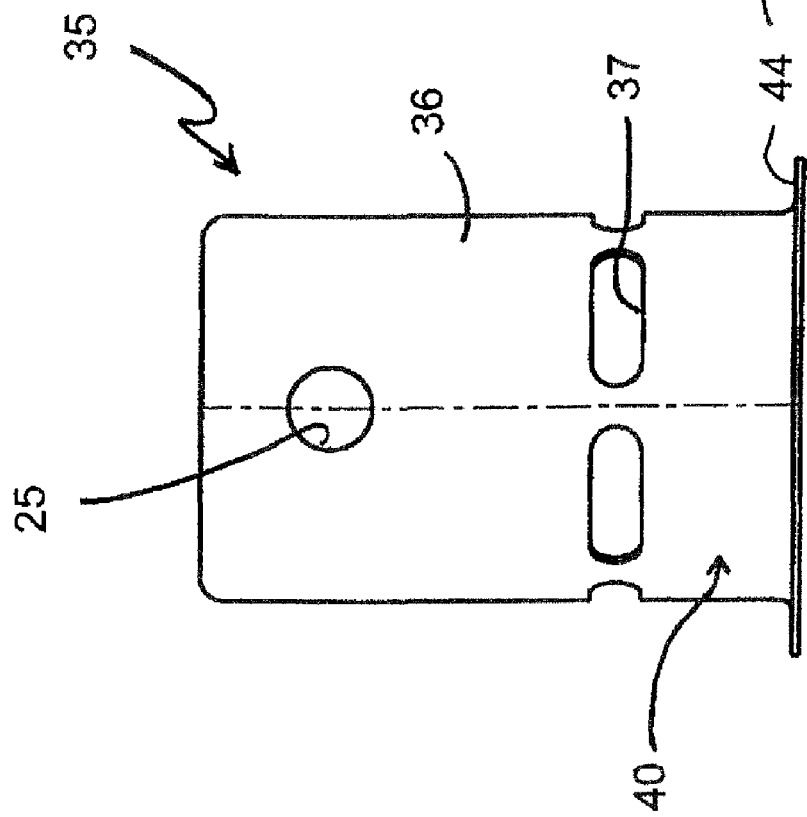
FIG. 4 is a side plan view of the additive cartridge of FIG. 3.

As seen in the cross-sectional view of FIG. 5, the cartridge shell 35 also includes a horizontal dividing wall 39 extending across a part of the side wall 36 above the apertures 37. The dividing wall 39 subdivides the shell 35 into two sections, a lower baffle portion 40 and an upper dispenser housing 41 containing a hollow storage chamber 42 therein.

The cartridge shell 35 has at least one opening 25 formed therethrough to allow fluid communication between the storage chamber 42 and the exterior of the cartridge. The opening(s) may be formed in the side wall 36, the cap 38, and/or the dividing wall 39. The number and size of the opening(s) 25 may be selected to control the rate of dissolution of the additive material 16 from the dispenser housing 41 for a particular application.

In the embodiment of FIGS. 2-5, the additive cartridge 35 also has a horizontal flange 44 extending transversely outwardly from the side wall 36 at the base of the baffle 40. The flange 44 may be included to cooperate with the anti-drainback valve 19, to help seal against fluid bypassing the mechanical filter 15 under normal operation conditions.

In the practice of the present invention, the additive cartridge 18 is preferred to be located in the flow path downstream of the mechanical filter element 15, in order to allow the beneficial additive composition thereof to be released into the oil on the clean side of the filter element, after mechanical filtration has been achieved.

The additive cartridge 18 contains a beneficial additive composition therein, which may be a solid block 16, as shown in FIG. 2A. In other words, the additive composition 16 may be solid at standard temperature and pressure, defined as 25 degrees C. and one atmosphere pressure.

The additive composition 16 may be injected into the cartridge shell 35 in a hot liquid state, and allowed to solidify as it cools. Alternatively, the additive composition 16 may be added in powdered form, or may be dispersed in a grease or wax. The additive composition 16 is preferred to be at least partially soluble in hot engine oil.

The additive composition 16 includes one or more additives which may be selected from the group including basic conditioners, corrosion inhibitors, metal deactivators, antioxidants, dispersants, friction modifiers, oil stabilizers, pour point depressants, detergents, viscosity index improvers, anti-wear agents, extreme pressure additives, mixtures of the above additives, and/or other known beneficial additives.

The basic conditioner of the additive cartridge, where used, is preferably a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

The material selected for the cartridge shell 35 is preferred to be a material which remains stable in a hot oil environment. Preferred materials are metals such as steel and oil-tolerant plastics such as, e.g., polyacetals. The cartridge 18 allows the beneficial additive composition 16 to be slowly released into the oil, thereby conditioning the oil in a metered manner over time.

Figure 2B:
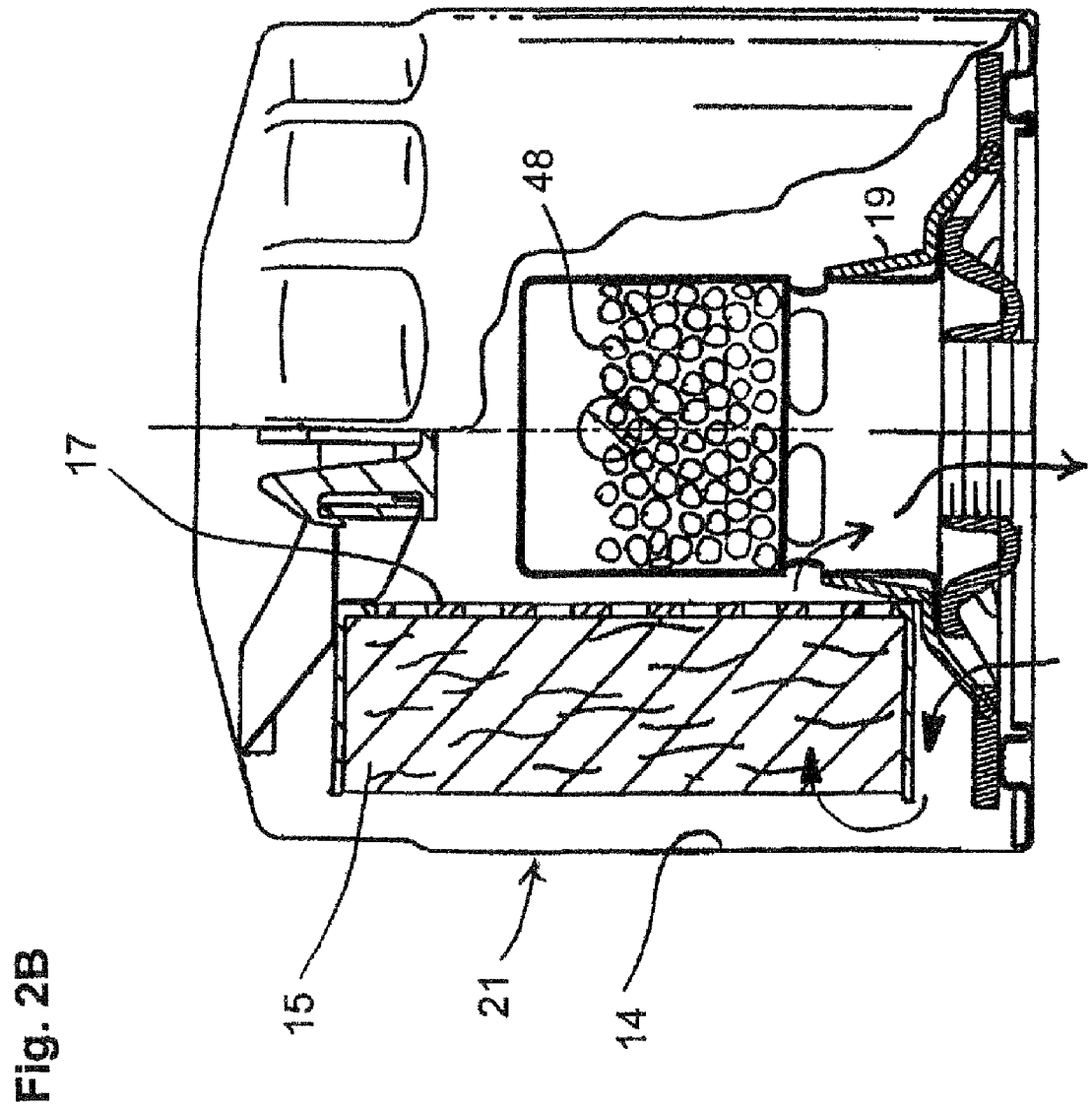
FIG. 2B is a side plan view of another alternative exemplary embodiment of the oil filter of FIG. 1, partially cut away and partially shown in cross-section, wherein a hollow additive cartridge contains a plurality of pellets formed of an additive composition.
Figure 3:
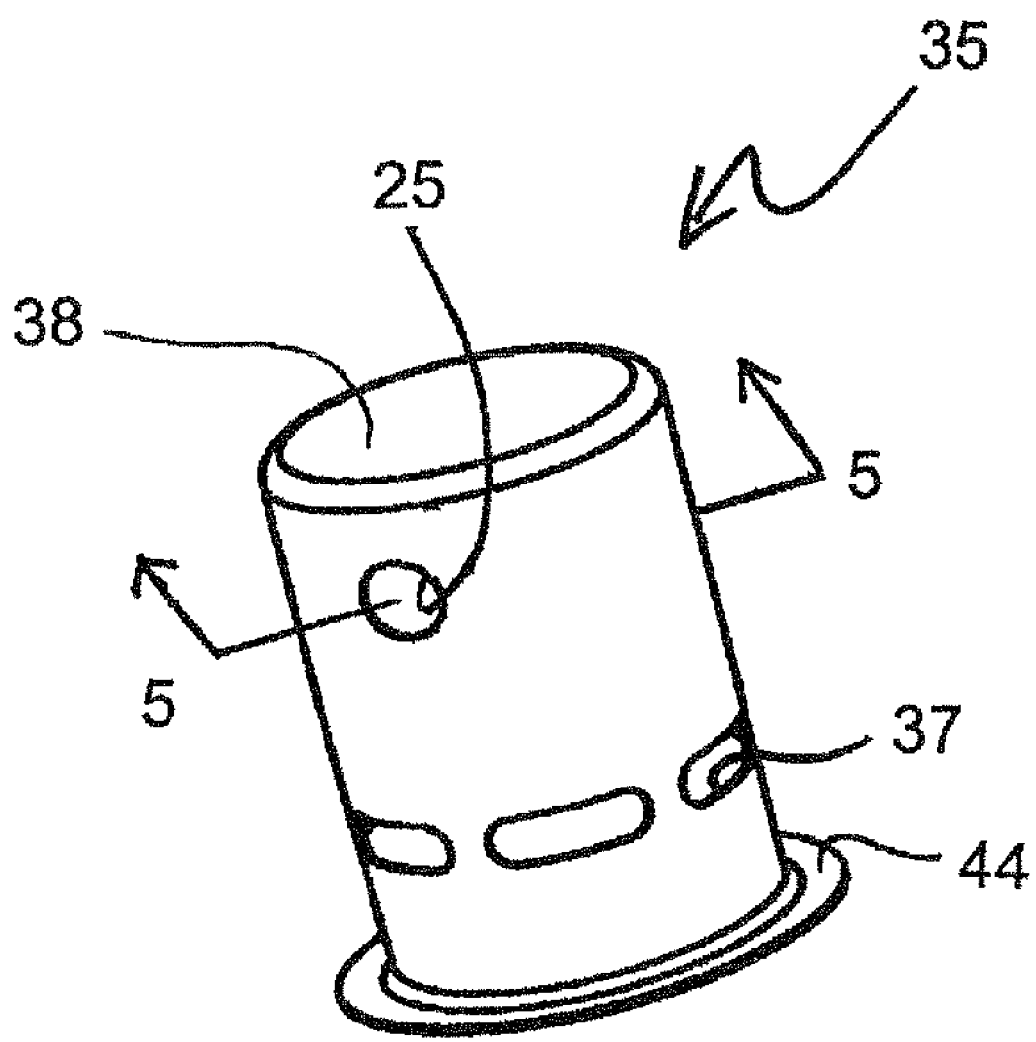
FIG. 3 is a perspective view of an additive cartridge, which is a component of the oil filters of FIGS. 1, 2A and 2B.

Alternatively, as shown in FIG. 2B, the concentrated additive composition in the cartridge 18 may be provided as a plurality of separate individual pellets 48, in order to provide greater surface area than is afforded with the solid additive block 16 of FIG. 2A.

Where pellets 48 are used, they may be disassociated and separate from one another.

Alternatively, the individual additive-dispensing pellets 48 housed within the cartridge shell 35 may be bonded together or otherwise cohesively associated with one another to form a substantially integral, yet highly porous structure capable of independent self-support. Where the pellets 48 are joined together in this way, the cartridge shell 35 is not required, and may be omitted if desired.

During use, as hot oil slowly flows past and around the cartridge 18, some of the oil enters the dispenser housing 41 via the opening 25, causing a small amount of the beneficial additive 16 to pass outwardly from the dispenser housing, and to mix with the oil. Where used, the basic salt component of the additive 16 acts to counteract and neutralize acidic combustion products. This neutralization of acidic combustion products allows for a much longer useful life of some other oil additives such as, for example, dispersants and zinc dialkyldithiophosphate (ZDP), which are provided in the oil by the manufacturer thereof. This, in turn, allows for greater intervals between oil changes than is possible without the chemically active filter element.

Figure 6:
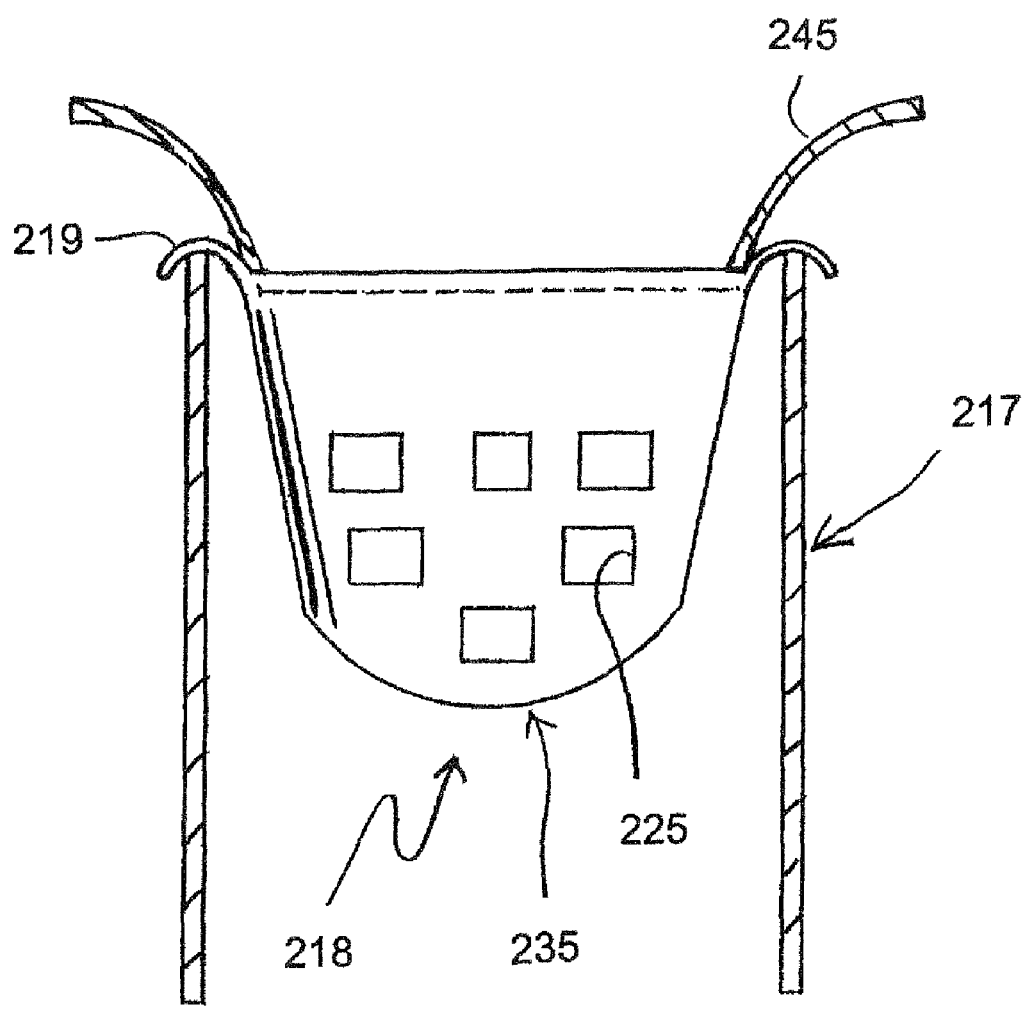
FIG. 6 is a side plan view, partially in cross section, of an alternative additive cartridge in accordance with alternative exemplary embodiment of the invention, wherein the cartridge takes the general form of a basket.

Referring now to FIG. 6, an additive cartridge 218 in accordance with a second embodiment of the invention is shown. Unless specified or depicted as being different herein, the additive cartridge 218 is substantially similar to the additive cartridge 18 as previously described. Those in the art will understand that the additive cartridge 218 of FIG. 6 may be substituted into the oil filter 20 of FIG. 2A instead of the additive cartridge 18 thereof, located above the center tube as indicated by FIG. 6.

The cartridge 218 in this embodiment includes a hollow cartridge shell 235 in the form of a basket. The shell 235 is either supported by or otherwise attached to the center tube 217. While the center tube 217 is shown in simplified form in the drawings, it will be understood that it is a porous member. The shell 235 may include a top flange 219 for connecting to the center tube. The shell 235 has a recessed space formed in the top thereof for supportively receiving a retainer spring 245. The shell 235 also has one or more openings 225 formed therein to allow fluid communication with between the interior thereof and the space surrounding the shell. A solid additive concentrate 216 is provided inside of the shell 235, in a manner similar to that described above for the first embodiment. The additive may be in one piece or may be pelletized.

Figure 8:
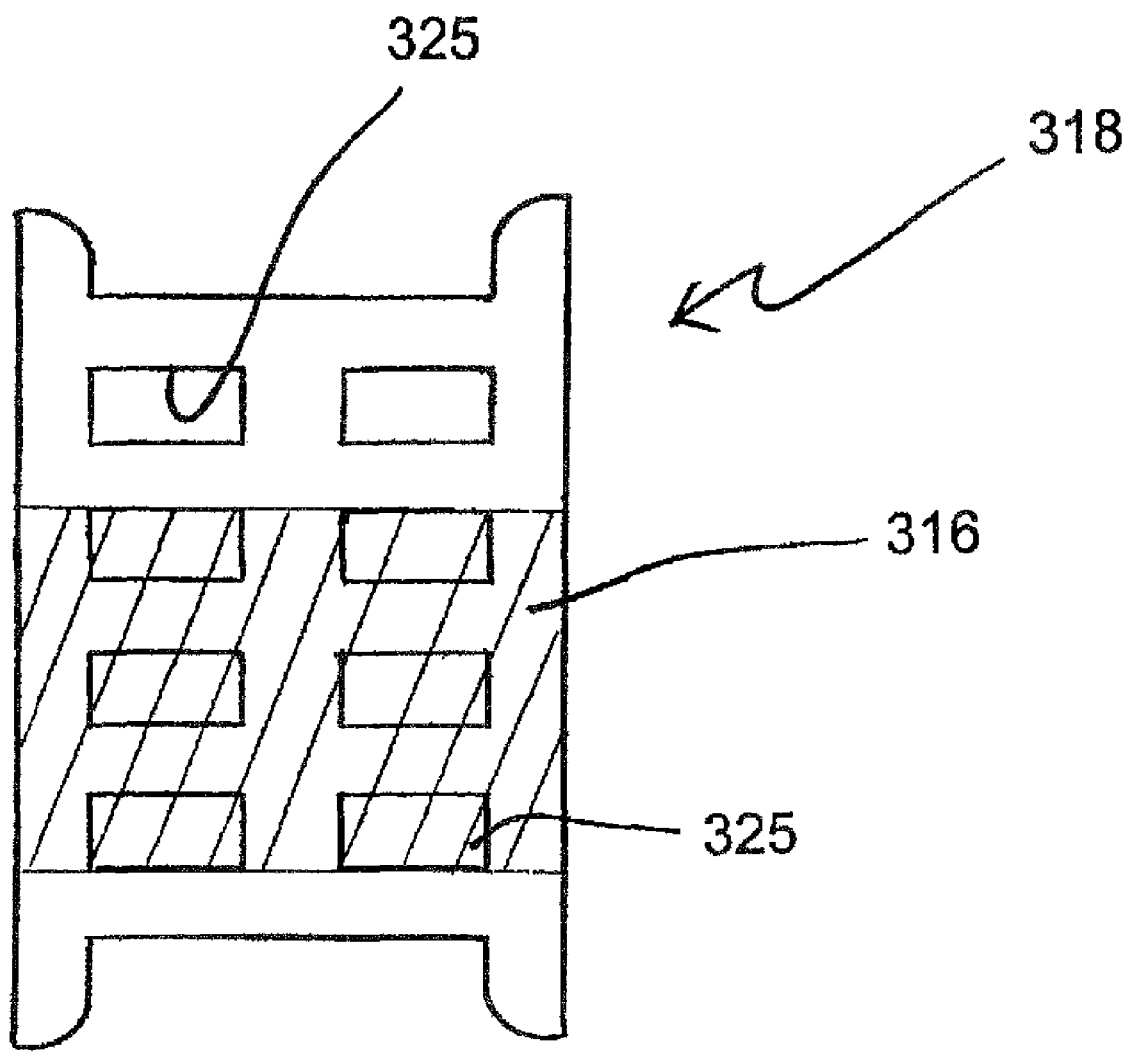
FIG. 8 is a side plan view of another alternative additive cartridge in accordance with another alternative exemplary embodiment of the invention, wherein the cartridge takes the general form of a hollow center tube with an additive composition contained therein.
Figure 12:
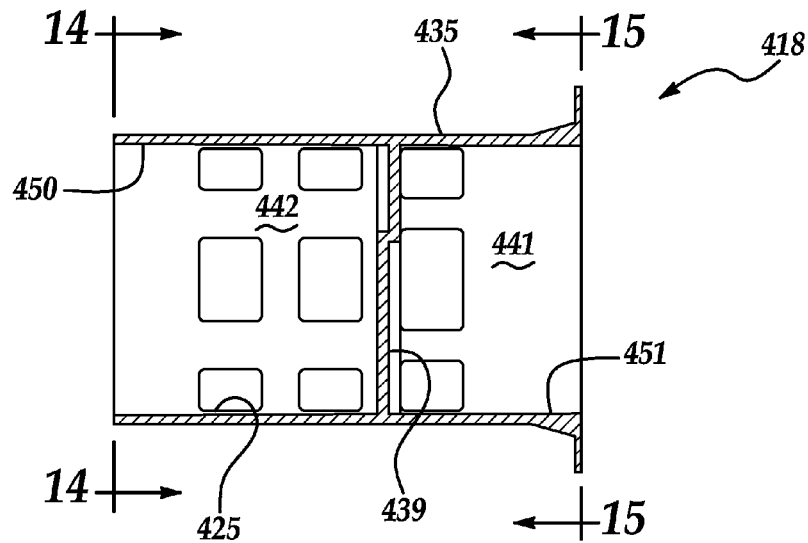
FIG. 12 is a cross sectional view of the cartridge of FIGS. 9-11.
Figure 13:
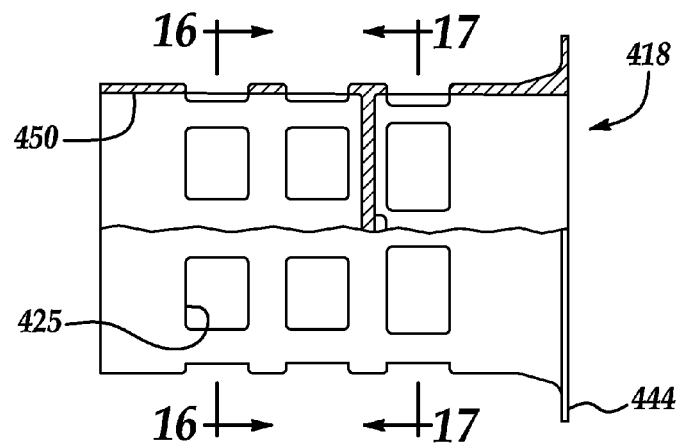
FIG. 13 is a partial cross sectional view of the cartridge of FIGS. 9-11.
Figure 14:
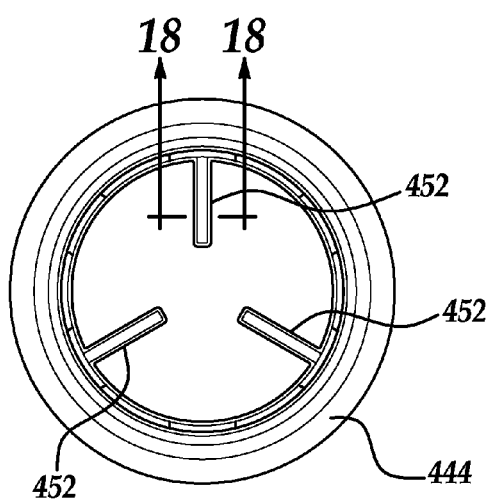
FIG. 14 is a view along lines 14-14 of FIG. 12.
Figure 15:
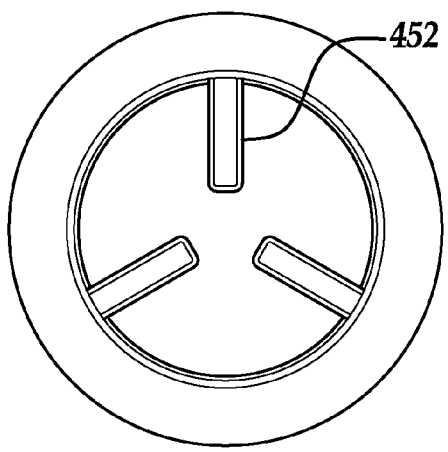
FIG. 15 is a view along lines 15-15 of FIG. 12.
Figure 16:
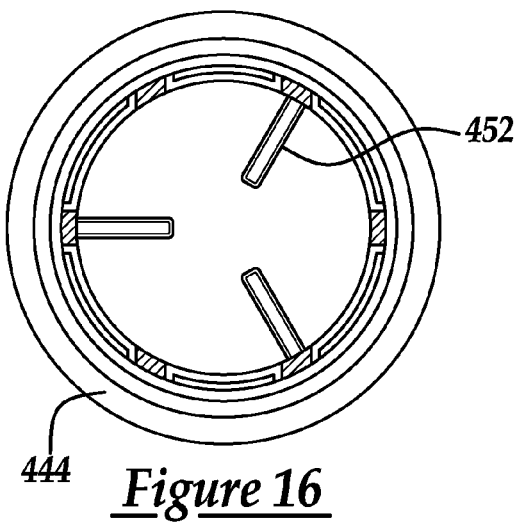
FIG. 16 is a view along lines 16-16 of FIG. 13.
Figure 17:
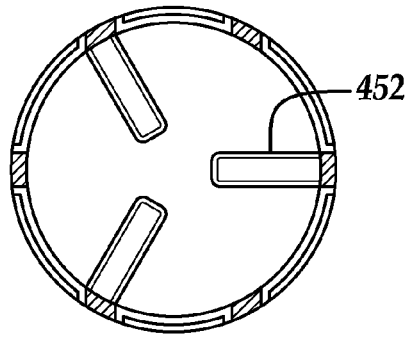
FIG. 17 is a view along lines 17-17 of FIG. 13.
Figure 18:
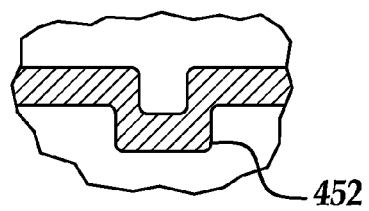
FIG. 18 is a view along lines 18-18 of FIG. 14.

Referring now to FIG. 8, an additive cartridge 318 in accordance with a third embodiment of the invention is shown. Unless specified or depicted as being different herein, the additive cartridge 318 is substantially similar to the additive cartridge 18 as previously described. Those in the art will understand that the additive cartridge 318 of FIG. 8 may be substituted into the oil filter 20 of FIG. 2A instead of the additive cartridge 18 and center tube 17 thereof.

Figure 7:
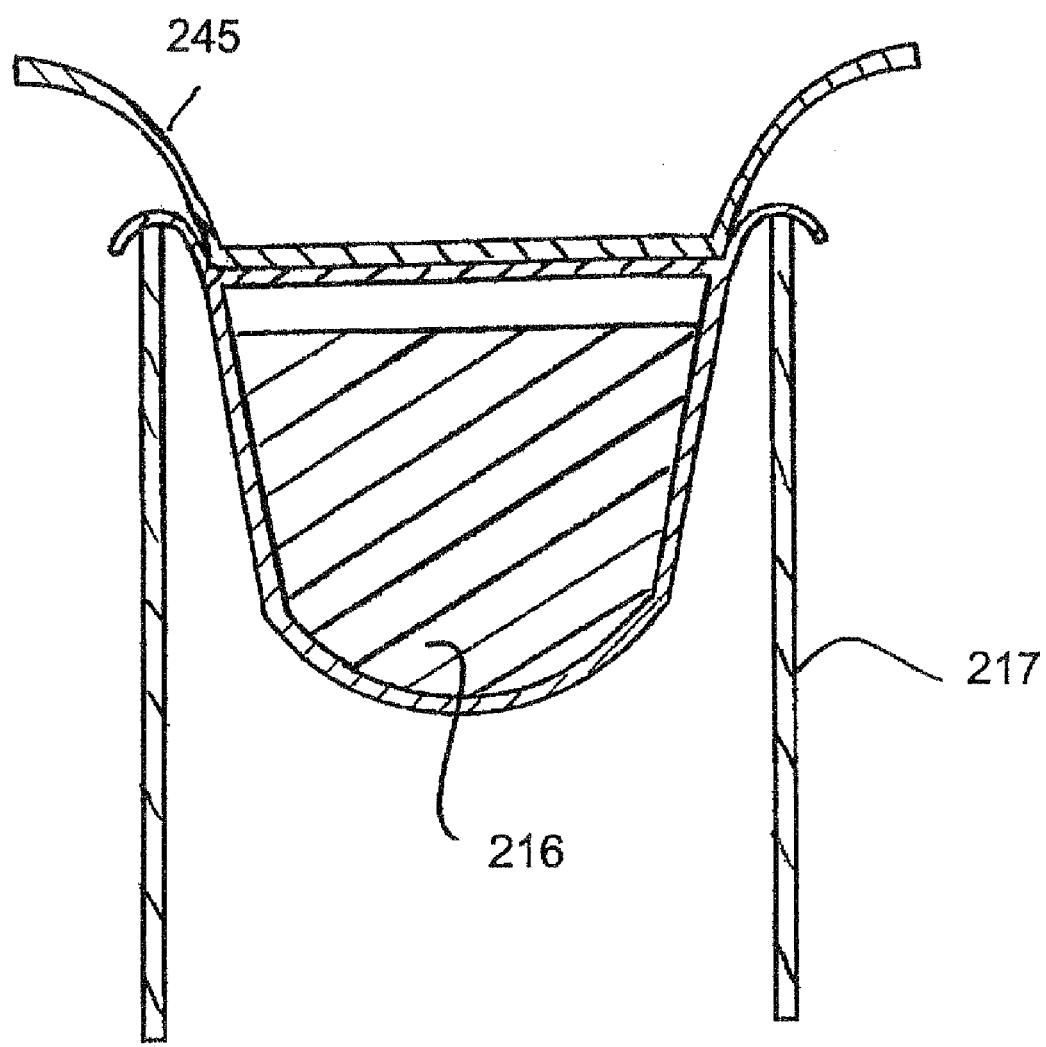
FIG. 7 is a cross-sectional view of the cartridge of FIG. 6, showing a solid additive concentrate therein.

The cartridge 318 in this embodiment is a modified center tube. In the embodiment of FIGS. 6-7, the cartridge 318 includes a hollow cylindrical shell 335 with a solid additive 316 contained therein. The shell 235 also has one or more openings 325 formed therein to allow fluid communication with between the interior thereof and the space surrounding the shell. A solid additive concentrate 316 is provided inside of the shell 235, in a manner similar to that described above for the first embodiment. The additive may be in one piece or may be pelletized.

Referring now to FIGS. 9-20 another exemplary embodiment of the present invention is illustrated. Here component parts performing similar or analogous functions are labeled in multiples of 100. Referring now to FIGS. 9-18, an additive cartridge or a carrier/disbursement device 418 for an additive 416 is illustrated. In exemplary embodiment, disbursement device 418 comprises a shell portion 435 that defines a first receiving area 441 and a second receiving area 442. In accordance with exemplary embodiment, first receiving area 441 and a second receiving area 442 are separated by a dividing wall 439. In addition, first receiving area 441 defines a portion of an outlet fluid path of the oil filter wherein fluid flows into a plurality of openings 425 disposed above wall 439, which provide fluid communication to first receiving area 441.

Disbursement device 418 comprises an annular flange 444, which depends outwardly from the periphery of first receiving area 441. Annular flange 444 provides a securement means for insertion of disbursement device 418 within a central portion of the oil filter.

As illustrated in FIGS. 10 and 11 second receiving area 442 is defined by the side walls of shell portion 435 which depend downwardly from dividing wall 439, and dividing wall 439. Flow is permitted into second receiving area 442 by a plurality of openings 425 in shell portion 435 which are disposed below dividing wall 439. In addition, access is also provided to second receiving area 442 through an opening 450 defined at the bottom of disbursement device 418. Opening 450 is defined by the end of the walls of shell portion 435 which depend downwardly from dividing wall 439.

Accordingly, additive 416 when positioned in area 442 is in fluid communication with fluid flowing through the oil filter via openings 425 disposed below dividing wall 439 and opening 450. Opening 425 and opening 450 maximize the surface area of additive 416 that is in fluid communication with the oil. Moreover, this large amount of surface area exposure allows additive to more uniformly disperse into the oil. In addition, the rate of additive dispersement can be determined by the amount of exposed surface area. Thus, by determining the amount of exposed surface area defined by openings 425 and 450 the rate of dispersement of the additive can be determined.

In exemplary embodiment, shell portion 435 defines a cylinder that is open at either end and divided into two chambers by dividing wall 439, which traverses across the diameter of the cylinder defined by shell portion 435. Moreover, additive 416 is disposed in additive containment chamber (area 442) wherein fluid communication to the additive is provided by a plurality of apertures in the wall portions of the cylinder defining the additive chamber as well as one of the open ends of the cylinder.

In accordance with an exemplary embodiment, and in order to disposed additive 416 within second receiving area 442, disbursement device 418 is positioned such that annular flange 444 is disposed on a supporting surface and opening 450 is positioned to receive additive 416. Thus, the larger opening 450 is positioned to receive the additive in a viscous or un-cured state. In accordance with an exemplary embodiment, additive 416 is placed within receiving area in a liquid state and then cured into a gel form such that additive 416 remains in receiving area 442 once cartridge 418 is disposed into the oil filter. The consistency of the additive when cured will allow the same to be retained in area 442 while still allowing slow dispersement into oil or fluids passing through the filter. Alternatively, additive 416 may be dispersed into area 442 in a cured state. Additive 416 is retained within area 442 due to the frictional engagement of the additive against the surface of the dividing wall as well as the inner wall not having openings 25 disposed therein.

In an alternative embodiment, and in order to provide further retention of additive 416 in area 442, the inner surfaces of walls 435 defining area 442 are textured to have a rough surface in order to increase the coefficient of friction between the surface of wall 435 and the additive disposed therein. One non-limiting example is to provide the wall of area 442 with a bead blasted surface. In yet another alternative, striations or grooves are disposed on the surface of wall 435.

Other non-limiting examples of materials comprising additive 416 are those disclosed in the following United States Patent Publications: U.S. 2004/0058830 A1; U.S. 2003/0134753 A1; U.S. 2003/0119682 A1; U.S. 2003/0087769 A1; U.S. 2003/0158051 A1; and U.S. 2002/0002118 A1; the contents of each of which are incorporated herein by reference thereto.

Once gelled or cured into its final disbursement form the additive will stay in receiving area 442 when disbursement device is rotated such that opening 450 is disposed on the bottom of the disbursement device.

In an alternative embodiment, and referring now to FIG. 9a screen member 462 is disposed within second receiving area 442. In this embodiment, screen member 462 provides a means for retaining large portions of additive 416 therein while allowing smaller portions to be dispersed within the oil passing thereby. Alternatively, screen member 462 is capable of being positioned over opening 450 in addition to openings 425. In yet another alternative screen member is only disposed over opening 450.

In yet another alternative, and referring to the dashed lines in FIG. 9, the portion of wall 435 defining second receiving area 442 is replaced by a screen material 464. In this embodiment, the screen material is configured to surround and retain additive 416 therein while still allowing the same to be disbursed into the fluid passing through the filter and past the openings of the screen retaining the additive. In this embodiment, the screen material 464 may be disposed over additive 416 or additive 416 may be dispersed into a screen member before it is secured to the remainder of disbursement device 418.

At the opposite side of the cylinder, an outlet flow path is defined by a plurality of apertures disposed within the wall portion of the cylinder defining the flow chamber as well as the other open end 451 of the cylinder.

In accordance with exemplary embodiment, the disbursement device is manufactured out of an easily molded material such as plastic wherein device 418 may be formed from an injection molding process and the materials comprising device 418 are capable of withstanding the temperatures and compositions encountered in the oil filter environment as well as the manufacturing processes for disposing the additive within the additive containment chamber, an example of such a material is an oil tolerable plastic such as; polyacetals, nylon 6/6 and equivalents thereof. Other contemplated materials include steel or other metals and/or alloys suitable for applications discussed herein.

In an exemplary embodiment, a first row of openings provide fluid communication into first receiving area 441, while a pair of rows of openings provide fluid communication into second receiving area 442 as well as opening 450.

In addition, it is also noted that in one embodiment, the openings 425 providing fluid flow into first receiving area 441 are rectangular shape wherein the length of the opening is larger than the width while the openings 425 in the side walls defining second receiving area 442 are square or have a width substantially similar to a height. Of course, is understood that the size, configuration, location and number of apertures 425 may vary.

Although FIGS. 9-18 illustrate a specific configuration of the additive cartridge or disbursement device 418, it is understood that alternative configurations are considered to be within the scope of the present invention. For example, shell portion 435 may define a non-circular (e.g., ellipse, square, rectangle, triangle, trapezoid etc.) housing for both the first and second receiving areas. In addition, the number, size, configuration and location of openings 425 may also vary to include non-rectangular or square openings as illustrated in the Figures.

Referring now specifically to FIGS. 12 and 14-18 a plurality of spud stand off ribs 452 are located to protrude away from a surface of dividing wall 439 into first receiving area 441. Stand off ribs provide a relief away from the surface of dividing wall 439 defining area 441. This feature or protrusion will prevent an elongated spud from the engine being flushly mounted to the surface of dividing wall 439 thereby limiting fluid flow through the filter. Accordingly, ribs 452 ensure a limited amount of fluid flows through filter 420.

Figure 19:
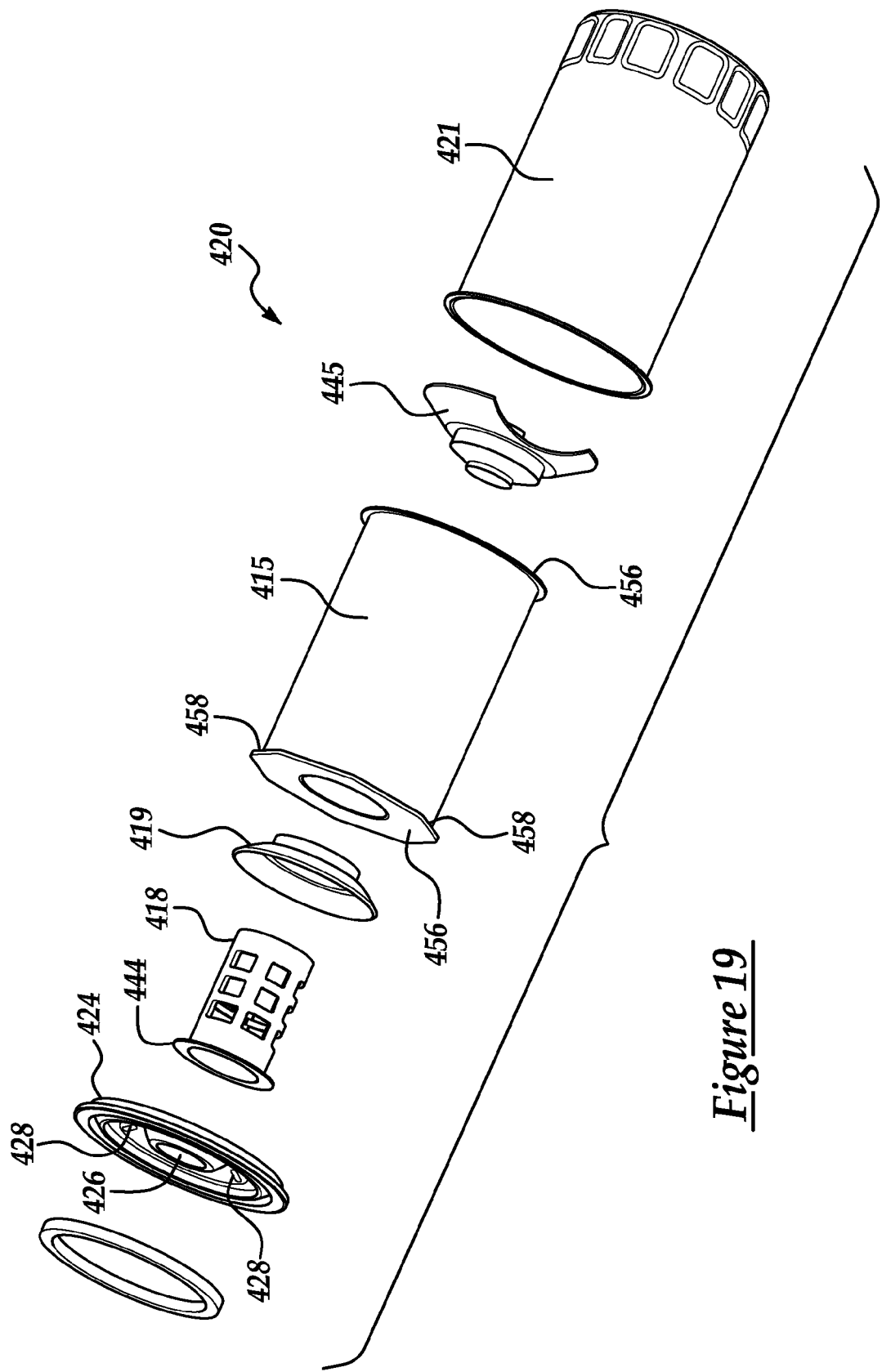
FIG. 19 is an exploded view of an oil filter constructed in accordance with exemplary embodiments of the present invention.

Referring now to FIG. 19, an exploded view of an oil filter 420 constructed in accordance with an exemplary embodiment of the present invention is illustrated. Here additive cartridge or disbursement device 418 is inserted within a central opening of anti-drain back valve 419, which in an exemplary embodiment comprises a rubber gasket having a flange portion that covers a plurality of inlet openings 428 in a baseplate 424. The flange portion of the anti-drain back valve prevents reverse flow of un-filtered fluid through openings 428 while allowing flow of fluid into the filter through openings 428. The elastomeric material of anti-drain back valve 419 allows the valve to operate in such a manner. It is noted that filter 420 may be assembled manually or via an automated assembly line.

Once the filter is assembled flange 444 of additive cartridge 418 sits within a seat defined within anti-drain back valve 419. As illustrated, the shell portion or cylindrical portion 435 of additive cartridge 418 is disposed within a central cavity defined by the media of filter element 415. In an exemplary embodiment filter element 415 comprises a pleated filter media that is configured to allow fluid flow therethrough and defines a cylinder or other equivalent structure through which oil must flow through prior to its entering the center portion of the filter element. In addition, filter element 415 comprises a pair of end caps 456 disposed at either end of filter element 415.

In exemplary embodiment, the end cap disposed proximate to additive cartridge 418 or at the inlet end of the filter comprises a plurality of flat surfaces 458 defined about the periphery of the end cap such that once the non-circular periphery of the end cap is disposed within the filter housing the filter element is centrally disposed within the housing while also providing a plurality of fluid paths between the flat surfaces of the end cap and the filter housing. Accordingly, when the filter media is disposed within the cylindrical housing 421 a plurality of fluid paths are defined for fluid flow in into the filter through openings 428 past anti-drain back valve 419 through the openings defined between housing 421 and flat surfaces 458 of end cap 456 and ultimately through the media of filter 415. Once past through the media of filter element 415, the fluid is now in fluid communication with additive 416 disposed in second receiving area 442 via opening 450 and openings 425 disposed below dividing wall 439. Fluid flow is then permitted back into the engine in the outlet flow path defined by openings 425 disposed above dividing wall 439 and opening 451, which ultimately allows fluid flow into a central outlet port 426 of baseplate 424.

Figure 20:
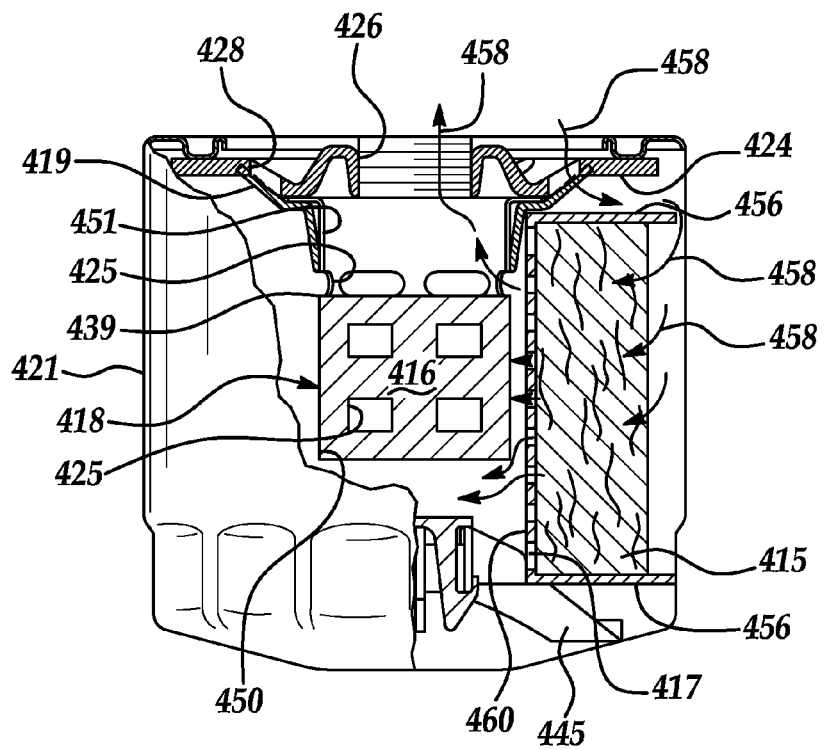
FIG. 20 is a partial cross sectional view of an oil filter constructed in accordance with exemplary embodiments of the present invention.

Referring now to FIG. 20 a partial cross-sectional view of an oil filter 420 constructed in accordance with an exemplary embodiment of the present invention is illustrated. As illustrated flange 444 of cartridge or dispersement member 418 is sandwiched between a surface of base plate 424 and anti-drain back valve 419.

Here fluid flow through the filter is illustrated by arrows 458. As illustrated, fluid to be filtered enters through openings 428 past anti-drain back valve 419 and through the openings defined between housing 421 and flat surfaces 458 of end cap 456 and ultimately through the media of filter 415. Once passed through the media of filter element 415, the fluid passes through a plurality of openings 460 in a center tube 417. Center tube 417 is disposed within filter housing 421 and comprises a plurality of openings therein to define a fluid path from the exterior of the center tube into the interior of the center tube.

As illustrated, additive cartridge 418 is substantially disposed within center tube 417 and fluid therein is now in fluid communication with additive 416 disposed in second receiving area 442 via opening 450 and openings 425 disposed below dividing wall 439. As illustrated, opening 450 is disposed in a facing space relationship away from the bottom of the filter, which in an exemplary embodiment comprises a retainer 445 to exert a force against one end of center tube 417.

Fluid flow is then permitted back into the engine via the outlet flow path defined by openings 425 disposed above dividing wall 439 and opening 451, which ultimately allows fluid flow through a central outlet port 426 of baseplate 424. Another feature of the present invention is that filtered oil in the filter during engine shut down is in constant contact with additive 416 thus, once the engine is started again fluid or oil with an additive disposed therein is carried to other parts of the engine. Accordingly, fluid containing additive 416 disposed therein is now used with the device (e.g., engine) having filter 420 disposed thereon.

Figure 21:
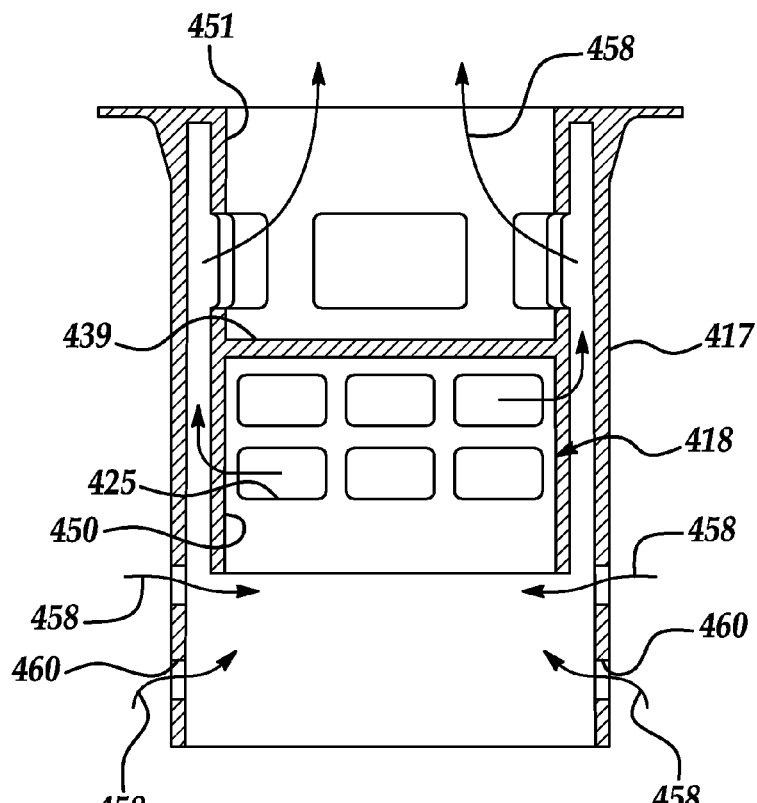
FIG. 21 is a cross sectional view of an additive cartridge or dispensing device in accordance with an alternative exemplary embodiment.

In an alternative embodiment and referring now to FIG. 21, center tube 417 is manufactured to comprise a single integrally molded piece having additive cartridge 418 integrally molded therein. In addition, the openings in the sidewall of center tube 417 can be positioned to be proximate to the additive thus, increasing the flow past additive 416. Of course, the number of openings in the walls of center tube 417 depend on the desired flow through filter 420.

As discussed herein additive 416 disposed in additive cartridge 418 provides a means for providing time release technology that may comprise any one of numerous additives, combinations thereof, including but not limited to detergents, antioxidants, ash-less antioxidants, dispersants and ash-less dispersants. Other contemplated compositions for additive 416 may include a fuel economy oil viscosity modifier wherein the additive or viscosity modifier causes and increase in engine fuel efficiency due to reduced friction in the engine. In other contemplated embodiments, the additive may comprise a cold weather formula for use on colder months wherein it is more desirable to have a lower viscosity oil in order to assist in cold whether start ups. Thus, the filter is capable of being configured for seasonal use depending on geographical locations.

In addition, an oil filter with additive 416 disposed therein will extend the acid neutralizing ability of the oil. For example, oils can be more acidic within 3,000 miles, thus use of the additive of exemplary embodiments of the present invention will reduce sludge formation, reduce high temperature deposits and ring sticking and improves performance of engine oil.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for dispersing an oil additive into an oil passing through a filter, the method comprising:
    filling a first cavity of an additive cartridge with an additive, the first cavity being adjacent to and separated from a second cavity of the additive cartridge;
    locating the first cavity and at least a portion of the second cavity of the additive cartridge within a filter element disposed within a housing of the filter, the first cavity and the second cavity of the additive cartridge being centrally located within an inner area defined and surrounded by the filter element and within a flow path through the filter, the second cavity being separated from the first cavity by a dividing wall and the second cavity does not have any additive disposed therein, the second cavity defining a first fluid path through the additive cartridge and the oil must pass through the second cavity in order to exit the filter, wherein the first cavity is completely received within the filter element and at least a portion of the second cavity is also received within the filter element; and
    metering the additive through an opening in the additive cartridge, the opening providing a second fluid path in fluid communication with the first cavity of the additive cartridge.

2. The method as in claim 1, wherein the additive comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

3. The method as in claim 2, wherein the additive comprises a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

4. The method as in claim 1, wherein the additive cartridge is located substantially centrally in a housing of the filter and the first fluid path is defined by at least two openings in the additive cartridge neither of which provides fluid communication to the first cavity.

5. The method as in claim 1, wherein the additive cartridge is formed from an oil intolerable plastic.

6. The method as in claim 1, wherein the additive is a gel.

7. The method as in claim 1, wherein the first cavity is positioned below the second cavity and the second cavity is positioned adjacent to an outlet opening of the filter.

8. A method for extending the useful life of a lubricating oil of an internal combustion engine by dispersing an oil additive into the lubricating oil passing through a filter coupled to the internal combustion engine, the method comprising:
    filling a first cavity of an additive cartridge with an additive through an opening defined at a distal end of the additive cartridge, the first cavity and the opening at the distal end of the cartridge being defined by a wall of the additive cartridge and the first cavity being adjacent to and separated from a second cavity of the additive cartridge, the second cavity of the additive cartridge also being defined by the wall of the additive cartridge;
    curing the additive in the first cavity such that when the additive cartridge is inverted and the opening at the distal end of the cartridge is below the first cavity and the second cavity, the cured additive remains in the first cavity;
    locating the first cavity and at least a portion of the second cavity of the additive cartridge within a filter element disposed within a housing of the filter, the first cavity and the second cavity of the additive cartridge being centrally located within an inner area defined and surrounded by the filter element and within a fluid flow path through the filter, the second cavity being separated from the first cavity by an internal dividing wall of the additive cartridge and the second cavity being free from cured additive disposed therein, the internal dividing wall completely separating the first cavity from the second cavity, the second cavity defining a first fluid path through the additive cartridge and the lubricating oil must pass through the second cavity in order to exit the filter, wherein the first cavity is completely received within the filter element and at least a portion of the second cavity is also received within the filter element; and
    metering the additive through an opening in the additive cartridge, the opening providing a second fluid path providing fluid communication into the first cavity of the additive cartridge.

9. The method as in claim 8, wherein the additive comprises at least one additive selected from the group consisting of basic conditioners, corrosion inhibitors, metal deactivators, antioxidants, dispersants, friction modifiers, oil stabilizers, pour point depressants, detergents, viscosity index improvers, anti-wear agents, extreme pressure additives, and mixtures thereof.

10. The method as in claim 8, wherein the additive comprises a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

11. The method as in claim 8, wherein the additive cartridge is located substantially centrally in a housing of the filter.

12. The method as in claim 8, wherein the additive cartridge is formed from an oil intolerable plastic.

13. The method as in claim 8, wherein the additive is a gel.

14. The method as in claim 8, wherein the additive cartridge is disposed on a clean side of the filter element disposed in the filter.

15. The method as in claim 14, wherein the additive cartridge is formed from an oil intolerable plastic and the additive is a gel.

16. A method for dispersing an oil additive into an oil passing through a filter, the method comprising:
    forming an additive cartridge, the additive cartridge having a cylindrical shell portion having a first opening at one distal end of the cylindrical shell portion and a second opening at an opposite distal end of the cylindrical shell portion;
    separating an interior of the shell portion into a first cavity and a second cavity by locating a dividing wall within the cylindrical shell portion;
    filling the first cavity of the additive cartridge with an additive through the first opening, the first cavity being adjacent to and separated from the second cavity of the additive cartridge;
    curing the additive in the first cavity such that when the additive cartridge is inverted and the first opening is located below the first cavity and the second cavity, the cured additive remains in the first cavity;
    locating the first cavity and at least a portion of the second cavity of the additive cartridge within a filter element disposed within a housing of the filter, the first cavity and the second cavity of the additive cartridge being centrally located within an inner area defined and surrounded by the filter element and within a fluid flow path through the filter, the second cavity being free from cured additive disposed therein and defining a first fluid path through the additive cartridge wherein the oil must pass through the second cavity in order to exit the filter and wherein the first cavity is completely received within the filter element and at least a portion of the second cavity is also received within the filter element; and
    metering the additive through at least one other opening in the cylindrical shell portion of the additive cartridge, the at least one other opening being located below the dividing wall and providing a second fluid path for providing fluid communication into the first cavity of the additive cartridge.

17. The method as in claim 16, wherein the additive cartridge is located within a center tube having a plurality of openings and wherein oil passing through the filter must first pass through the filter element before passing through the additive cartridge.

18. The method as in claim 16, wherein the additive cartridge is supported in the housing by a flange portion that extends from the cylindrical shell portion of the additive cartridge and a plurality of openings are formed in the cylindrical shell portion to define the first fluid path through the additive cartridge.

19. The method as in claim 1, wherein the additive cartridge is located within a center tube having a plurality of openings and wherein oil passing through the filter must first pass through the filter element before passing through the additive cartridge.

20. The method as in claim 8, wherein the additive cartridge is located within a center tube having a plurality of openings and wherein lubricating oil passing through the filter must first pass through the filter element before passing through the additive cartridge.

* * * * *